(12) United States Patent
Schreter

(10) Patent No.: US 10,341,168 B2
(45) Date of Patent: Jul. 2, 2019

(54) TOPOLOGY MANAGER FOR FAILURE DETECTION IN A DISTRIBUTED COMPUTING SYSTEM

(71) Applicant: SAP SE, Walldorf (DE)

(72) Inventor: Ivan Schreter, Malsch (DE)

(73) Assignee: SAP SE, Walldorf (DE)

(*) Notice: Subject to any disclaimer, the term of this patent is extended or adjusted under 35 U.S.C. 154(b) by 93 days.

(21) Appl. No.: 15/490,819

(22) Filed: Apr. 18, 2017

(65) Prior Publication Data
US 2018/0302270 A1    Oct. 18, 2018

(51) Int. Cl.
*H04L 12/24* (2006.01)
*H04L 12/803* (2013.01)

(52) U.S. Cl.
CPC ...... *H04L 41/0668* (2013.01); *H04L 41/0677* (2013.01); *H04L 41/12* (2013.01); *H04L 47/125* (2013.01)

(58) Field of Classification Search
CPC .............................. H04W 47/125; G06F 3/65
See application file for complete search history.

(56) References Cited

U.S. PATENT DOCUMENTS

| | | | |
|---|---|---|---|
| 7,685,109 B1* | 3/2010 | Ransil | G06F 17/30336 707/999.003 |
| 9,069,827 B1* | 6/2015 | Rath | G06F 17/30557 |
| 9,116,862 B1* | 8/2015 | Rath | G06F 11/2097 |
| 9,304,815 B1* | 4/2016 | Vasanth | G06F 9/4881 |
| 2002/0161889 A1* | 10/2002 | Gamache | G06F 11/1482 709/226 |
| 2003/0204509 A1* | 10/2003 | Dinker | G06F 17/30575 |
| 2006/0053139 A1* | 3/2006 | Marzinski | G06F 11/1435 |
| 2017/0177232 A1* | 6/2017 | Bortnikov | G06F 3/065 |
| 2018/0091588 A1* | 3/2018 | Qin | H04L 67/1012 |

* cited by examiner

*Primary Examiner* — Robert C Scheibel
(74) *Attorney, Agent, or Firm* — Mintz Levin Cohn Ferris Glovsky and Popeo, P.C.

(57) ABSTRACT

A topology manager implemented on a data partition of a distributed computing system can be notified that a destination computing node in the distributed computing system is not responding to a communication request. Upon determining that the destination computing node is dead and/or has a loss of communication with one or more, and optionally a majority of other computing nodes in a plurality of computing nodes of the distributed computing system, the topology manager can retire the destination computing node and cause a load balancing of replicas of data partitions in the distributed computing system to compensate for loss of the retired computing node.

17 Claims, 2 Drawing Sheets

TOPOLOGY MANAGER FOR FAILURE DETECTION IN A DISTRIBUTED COMPUTING SYSTEM

TECHNICAL FIELD

The subject matter described herein relates to distributed computing systems, and in various aspects to communication between nodes of such systems.

BACKGROUND

Nodes of a distributed computing system communicate over a communication network. Nodes can be computing systems that each include at least one programmable processor. A distributed system can, in a non-limiting example, be a plurality of computing nodes (also referred to simply as "nodes") that implement a distributed data storage application or any other kind of application in which exchange of messages between nodes occurs to enable the multiple nodes to remain synchronized with regard to processes being executed by the distributed computing system. A process as used herein refers generally to any kind of data processing, data storage, or other computer-implemented process. A communication network can include one or more of a wired network, a wireless network, a local area network, a wide area network, an organization's intranet, the Internet, or the like. Usually, nodes in a distributed system use consensus protocols to coordinate replication of data on several nodes to enable continued operation in case of a failure of one or more of the nodes of the cluster. Other nodes of a plurality of nodes besides a node being referenced are generally referred to as "peer nodes" or simply "peers" of the node.

SUMMARY

Aspects of the current subject matter can provide the ability to offer efficient and safe connection reestablishment procedures after network or node failures.

In one aspect, a method includes a topology manager of a distributed computing system receiving a notification that a destination computing node in the distributed computing system is not responding to a communication request, determining that the destination computing node is dead and/or has a loss of communication with one or more other computing nodes in a plurality of computing nodes of the distributed computing system, retiring the destination computing node in response to the determining, and causing a load balancing of replicas of data partitions in the distributed computing system to compensate for loss of the retired computing node. The topology manager is implemented on a data partition of the distributed computing system. The load balancing includes re-assigning one or more of the replicas of data partitions among one or more surviving computing nodes in the plurality of computing nodes.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a data storage application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
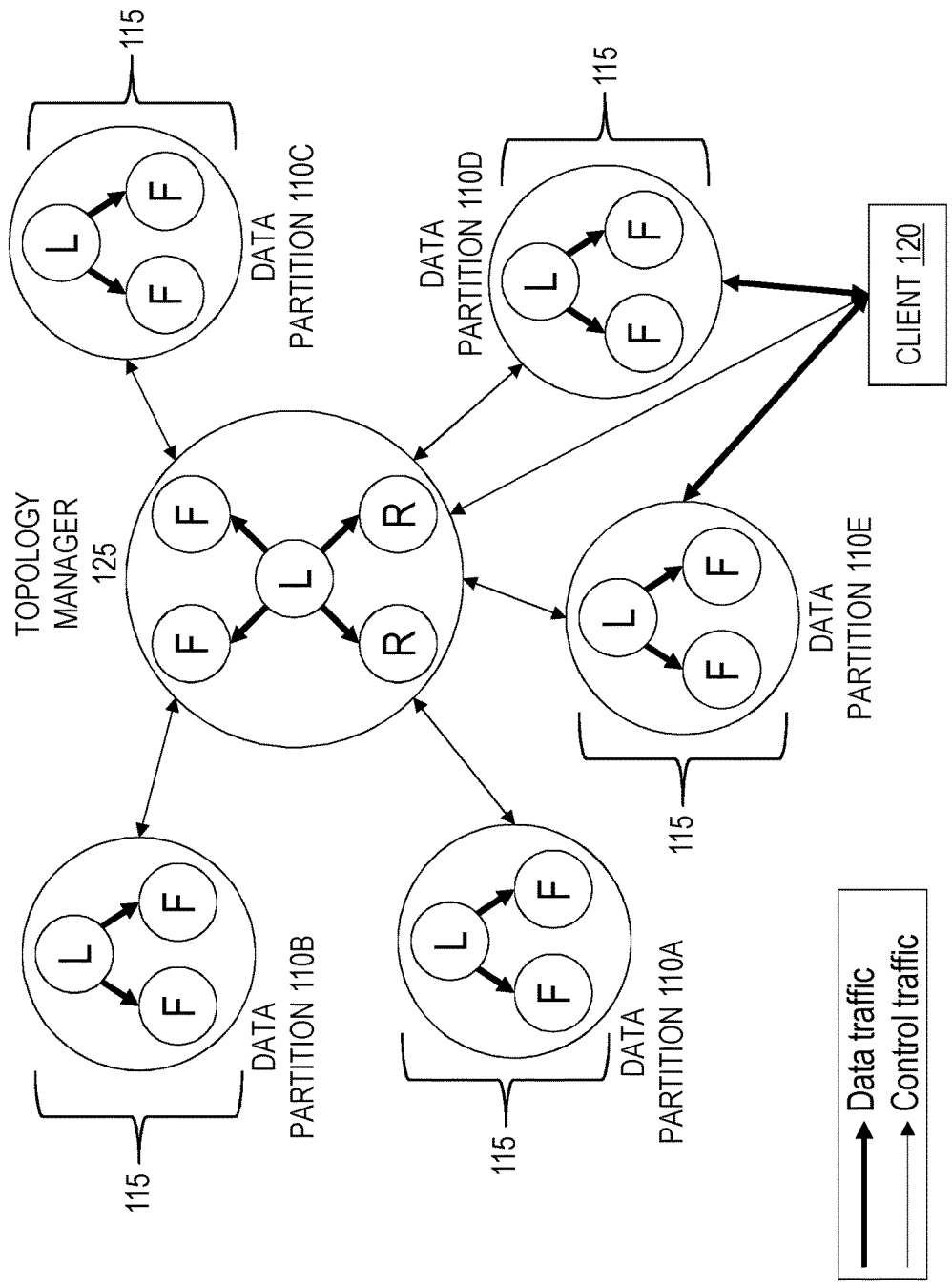
FIG. 1 shows a diagram illustrating aspects of a computing system arrangement having one or more features consistent with implementations of the current subject matter.

Partial network failures and/or node failures (e.g. crashes, restarts, etc. occurring at the computing system of one or more nodes) can be a relatively common occurrence in distributed computing systems, and particularly in larger-scale distributed systems with a large number of nodes, for example in distributed applications in which continuous connections between the nodes of a plurality of nodes cannot be guaranteed and/or if one or more nodes may fail or otherwise go out of service in the course of the distributed computing system being in productive use. In the event of a communication failure with a peer, a node generally attempts to re-establish communication with the peer. One or more of several issues can arise in such a situation. For example, detection of the communication failure can be necessary, as well as identification of whether any peer instance is still in the same state as before the communication was lost. Implementations of the current subject matter can provide a robust and efficient approach by which one or more nodes in a distributed computing system can reestablish communication with a temporarily unavailable peer in the distributed computing system.

Distributed computer systems typically use some kind of consensus protocol (such as Paxos or RAFT) to achieve data replication and consistency across nodes. To detect failed nodes, a conventional approach generally includes sending heartbeat messages and making use of timeouts. Such an approach can be sufficient for a small number of nodes in a distributed computing system, but may create significant network traffic for a large system, especially one which consists of many data partitions represented by smaller consensus islands within each respective partition. As a bonus, since the large system is partitioned into smaller data partitions using their own consensus protocol instances, the failure of one node of the system will only have effect on partitions it is hosting.

Consensus protocols can ensure that data replicated across several nodes remain in a consistent state and are widely used in distributed computing systems to achieve failure tolerance in clusters of computers. Each computing node in the cluster runs its own copy of a state machine. Consensus involves multiple nodes (e.g. servers, computing systems, data stores, etc.) being in agreement on data values. Once a consensus is reached, that decision is final. Consensus is typically reached when a quorum (e.g. a majority, a plurality, or some other definition etc.) of the nodes in the cluster decides to accept the new state of the system (e.g., adding new data to a database table, setting a value for a key in key value stores, accepting a message in messaging systems, etc.). The state of the state machine presented by the cluster is based on the consensus such that clients interacting with the cluster perceive the nodes as a single state machine having a consistent state. A consensus algorithm can ensure that if any of the state machines in a cluster applies a particular command at a particular point in a series of commands, none of the other state machines in the cluster will apply a different command at that same point in the series of commands. Well-known examples of consensus protocols include Paxos and RAFT.

Typical implementations of consensus protocols typically detect failure of a node by themselves (e.g., by the RAFT protocol timing out on no communication and initiating a new election of a leader node). Such an approach can add significant additional load on the network and currently unused partitions as the nodes stay in constant communication. However, elimination of such communication can require implementation of an alternative approach for providing a holistic view on the multi-partition system to permit proper administration, which can include, for example, detecting and retiring broken nodes, adding new nodes, etc.

Consistent with implementations of the current subject matter, one partition of a plurality of data partitions in a distributed computing system can be designated to act as a topology manager. The topology manager redundantly stores information about existing nodes in the system and the current state of these nodes. In this context, the current state of the existing nodes in the system refers to a current state as known to the topology manager.

Features of the current subject matter can be understood in reference to FIG. 1, which shows a diagram illustrating a logical view of features present in an example of a distributed computing system architecture 100 featuring multiple data partitions 110A, 110B, 110C, 11D, 110E, each of which may include a plurality of replicas 115 of the respective partition. In some implementations of the current subject matter, a single partition can be assigned to each of a plurality of computing nodes (e.g. computing systems that include one or more processors, machine readable memory, data storage, etc.) that communicate with each other and optionally with one or more client machines 120 over network communication pathways. In other implementations that are capable of realizing additional benefits in regards to ease of rebalancing of data partitions (e.g. as computing nodes are added to or removed from the system and/or as data loads change over time), the data in a system are split into a plurality of partitions, each having multiple replicas 115, and the replicas are assigned to the available computing nodes with each node hosting one or more replicas of one or more partitions. A plurality of replicas of a given data partition can also be referred to as a cluster.

In one non-limiting example, the computing system architecture 100 can implement a distributed data storage application (e.g. a database management system or other data storage application), which can involve the data partitions 110A, 110B, 110C, 11D, 110E, each storing some part or parts of data managed by the data storage application. Each of the replicas 115 of a given partition implements a state machine of the data storage application and is kept in a consistent state based on a consensus protocol exchanging messages among the replicas 115 of the data partition. The replicas 115 of a given partition can be managed according to a leader-follower protocol, in which each cluster has a leader replica (L, also referred to simply as a "leader") and one or more follower replicas (F, also referred to simply as a "follower"). Election of a leader can be performed according to whatever consensus protocol is being applied.

In a distributed data storage application, as well as in other distributed applications, processes running and/or data stored may need to be replicated or at least communicated to other replicas of each data partition 110A, 110B, 110C, 110D, 110E. In the event of a computing node failure, a node restart, a network disruption, or any other loss of communication, etc. (all of which are generically referred to herein with terms such as "loss of communication," "loss of communication between nodes," and similar phrasing), it is desirable to be able to quickly and efficiently determine whether such a loss of communication is the result of a particular computing node being "dead" (e.g. offline, disconnected from the networked communication pathways, etc.) or merely because of a temporary and/or local (e.g. not affecting communication of all other nodes with the given node) interruption in one or more communication pathways.

Also shown in FIG. 1 is a topology manager 125, which runs on at least one partition of the plurality of partitions. Functions of the topology manager 125 are described in greater detail below. It will be understood that reference herein to data storage applications and consensus protocols is not intended to be restrictive of the scope of the currently disclosed subject matter, but rather as an illustrative example of an environment in which the current subject matter can optionally be deployed.

A partition that acts as the topology manager 125 can be managed in a same manner as any other data partition 110A, 110B, 110C, 110D, 110E in the system. In other words, the partition implementing the topology manager 125 can have a leader (L) and followers (F). It may be advantageous for the topology manager partition to have more follower replicas (F) than other partitions as the topology manager 125 generally has a higher availability requirement. In contrast to other data partitions in the system, however, the topology manager partition uses a traditional timeout-based election timeout of the RAFT protocol to ensure a leader is always present without the need for external information.

When a connection between any two computing nodes in the distributed computing system breaks and cannot be reestablished or a request sent from one computing node to another is not answered until a timeout is reached, the topology manager 125 will be informed about potential failure of the destination node by the source node (assuming communication loss from the source node to a destination node that the source node finds to be unresponsive). Upon receiving such a notification, the topology manager 125 then requests from a set of other nodes in the system a confirmation of the failure. This request may be made to a full set of nodes or just a subset of nodes (e.g., a randomly-chosen subset of the nodes). If a quorum of these nodes in the system deems the potentially problematic node (e.g. the unresponsive destination node) to be unreachable, then that node is retired by action of the topology manager 125, and any partition replicas hosted on the now-retired node are rebalanced over other nodes of the distributed computing system, so that a replication factor is maintained after retiring the node. In the event that the node is deemed reachable, the connection can be retried by the communication source node, potentially resulting in another liveness query to the topology manager 125 if the source node continues to be unable to communicate with the destination node (e.g. a further communication timeout occurs).

After a node is retired, administrative action can occur to "fix" the retired node, for example to remedy whatever caused the retired node to lose communication with other nodes and to thereby return it to productive service, and/or to add a new node to the system. When a new node is added to the system (by the administrator or action of one or more automated processes, such as in a cloud computing arrangement), the topology manager 125 obtains and stores information about this new node in an internal state of the topology manager 125 and automatically rebalances the distributed computing system (e.g. by re-assigning partition replicas to make efficient use of the resources of the new node and other existing nodes in the distributed computing system.

Load-balancing algorithms for use in this process can take into account one or more properties, such as memory usage, secondary storage usage, CPU load, placement restrictions (e.g., replicas of a same partition must be placed on different nodes to ensure high availability), capabilities of the node (e.g., which types of state machines it supports), and the like.

In some implementations of the current subject matter, summary statistics or other data representative of a current level of usage of partition replicas hosted by individual nodes can be sent to the topology manager using periodic messages from each respective node to the topology manager. If such status messages are sent at some regular interval (e.g., one second for smaller clusters, several seconds for larger clusters), the messages can be also used as liveness messages that facilitate the topology manager determining "liveness" of a node. In this manner, the topology manager may not be required to explicitly ask individual nodes of the system for a ping upon supposed unreachability of a node in the system. In this case, the liveness of the node can be determined by the time since last status message received. For example, if no status message has been received by the topology manager from a given node for some preset number of messaging periods (i.e. the regular interval at which status messages are supposed to be sent), the topology manager can consider the node to be dead and determine that a corrective action needs to be taken.

Further to the above descriptions, election (e.g. using an election timeout and fire-and-forget messages) can be used initially to elect the master replica (also referred to above as a leader, L) for the topology manager 125. While it will be understood that the current subject matter may operate with other consensus protocols, various features are described herein in relation to the RAFT protocol. In establishing consensus between multiple replicas of the data partition that implements the topology manager 125 (and optionally other data partitions in the system) the RAFT protocol general involves transmission of a "match index" from followers (F) to a leader (L) to inform the leader what is the last common log entry index in a local log of each follower and a log of the leader. The RAFT protocol further includes transmission of a "commit index" from the current leader (L) to all of the followers (F) to inform the followers what is the globally agreed index of the last fully-replicated log entry.

Further to the above summary, the RAFT protocol classifies each replica in a cluster as being in one of a follower state (e.g. a replica node), a candidate state, or a leader state (e.g. a state in which a master or leader operates). All replicas in a cluster other than the leader or master have the follower state and can be referred to as replicas. However, when a current replica fails to hear from a leader of the cluster within some period of time, the follower can become a candidate and request votes from other replicas in the cluster as part of a leader election process. The candidate becomes the leader (L) if it receives a majority of the votes from the replicas in the cluster.

Consistent with implementations of the current subject matter, after initial election of a leader, all replicas of a data partition (e.g. any of data partitions 110A, 110B, 110C, 110D, 110E) that is not implementing the functionality of the topology manager 125 discussed above can assume semi-reliable communication for the time being and stop election timeouts. The leader of such a partition can replicate data to followers in a manner similar to that used in the RAFT protocol, but need not set retry timeouts.

Instead, a replica of such a cluster behaves as though liveness of all computing nodes to which replicas in its cluster is assumed until such time as a communication timeout occurs. It will be understood that a communication timeout can also occur between a client 120 and a node of the distributed computing system, thereby triggering action of the features discussed herein. When a node (or a client) detects a possible loss of communication, the source node (or client) detecting the potential communication break can contact the topology manager, which can make a determination of the liveness of the destination node experiencing the potential loss of communication. This determination can occur via querying other nodes in the system to obtain a quorum decision regarding liveness of the destination node in question and/or via checking at the topology manager whether a status message has been received from the destination node within some threshold time period.

Figure 2:
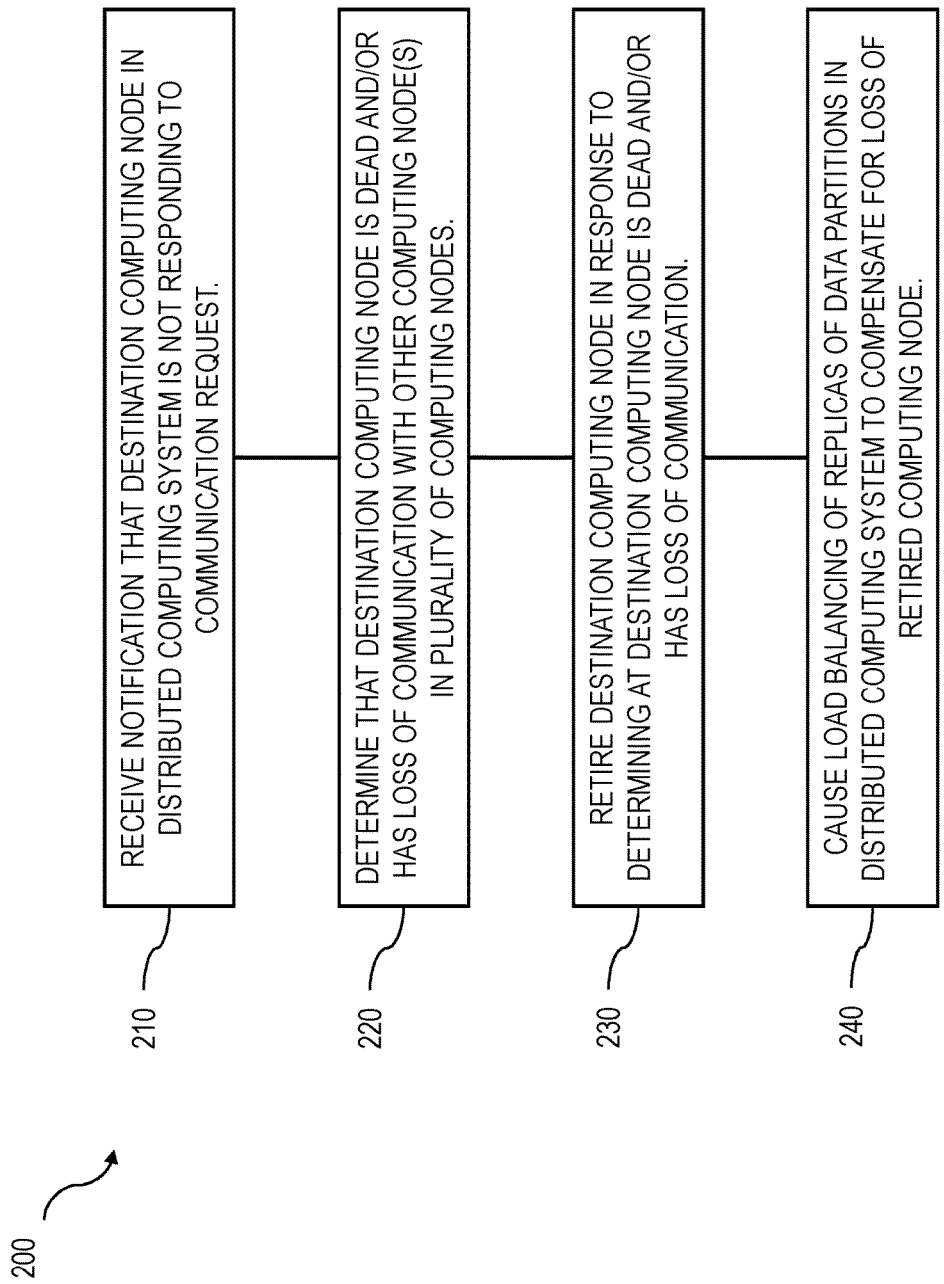
FIG. 2 shows a process flow diagram illustrating aspects of a method having one or more features consistent with implementations of a first aspect of the current subject matter.

FIG. 2 shows a process flow chart 200 illustrating features that can be included in a method consistent with implementations of the current subject matter. At 210, a topology manager of a distributed computing system receives a notification that a destination computing node in the distributed computing system is not responding to a communication request. As noted above, the topology manager can be implemented on a data partition of the distributed computing system. The distributed computing system includes a plurality of computing nodes, which includes the destination computing node. At 220, the topology manager determines that the destination computing node is dead and/or has a loss of communication with one or more other computing nodes in the plurality of computing nodes (optionally a majority of the nodes of the plurality of computing nodes). In response to the determining, at 230 the topology manager retires the destination computing node, which causes the destination computing node to become a retired computing node. At 240, the topology manager causes a load balancing of replicas of data partitions in the distributed computing system to compensate for loss of the retired computing node. The load balancing includes re-assigning one or more of the replicas of data partitions among one or more surviving computing nodes in the plurality of computing nodes.

Also as described above, the determining that the destination computing node is dead and/or has a loss of communication can include the topology manager querying at least a subset of other computing nodes of the plurality of computing nodes regarding liveness of the destination computing node. The destination computing node can be determined to be dead upon the topology manager receiving confirmation from a quorum of the queried computing nodes. The determining that the destination computing node is dead and/or has a loss of communication can also or alternatively include the topology manager identifying that the destination computing node has not sent a status message to the topology manager in longer than a present number of messaging periods. This identifying can be facilitated by the topology manager storing information about computing nodes in the plurality of computing nodes and a current state of these computing nodes.

The notification can be received at the topology manager from a source computing node of the plurality of computing nodes, for example if the source computing node has sent the communication request to the destination computing node. Alternatively or in addition, the notification can be received at the topology manager from a client machine accessing the distributed computing system, for example if the client machine has sent the communication request to the destination computing node.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, by a topology manager of a distributed computing system, notification that a destination computing node in the distributed computing system is not responding to a communication request, the topology manager being implemented on a data partition of the distributed computing system, the distributed computing system comprising a plurality of computing nodes, the plurality of nodes comprising the destination computing node;
determining, by the topology manager, that the destination computing node is dead and/or has a loss of communication with one or more other computing nodes in the plurality of computing nodes by querying at least a subset of other computing nodes of the plurality of computing nodes regarding liveness of the destination computing node and receiving confirmation from a quorum of the queried computing nodes;
retiring, by the topology manager in response to the determining, the destination computing node, the retiring causing the destination computing node to become a retired computing node; and
causing, by the topology manager, a load balancing of replicas of data partitions in the distributed computing system to compensate for loss of the retired computing node, the load balancing comprising re-assigning one or more of the replicas of data partitions among one or more surviving computing nodes in the plurality of computing nodes.

2. A computer-implemented method as in claim 1, wherein the determining further comprises the topology manager identifying that the destination computing node has not sent a status message to the topology manager in longer than a preset number of messaging periods.

3. A computer-implemented method as in claim 1, wherein the notification is received from a source computing node of the plurality of computing nodes, the source computing node having sent the communication request to the destination computing node.

4. A computer-implemented method as in claim 1, wherein the notification is received from a client machine accessing the distributed computing system, the client machine having sent the communication request to the destination computing node.

5. A computer-implemented method as in claim 1, wherein the topology manager stores information about computing nodes in the plurality of computing nodes and a current state of these computing nodes.

6. A computer-implemented method as in claim 1, wherein the one or more other computing nodes in the plurality of computing nodes comprises a majority of the plurality of computing nodes.

7. A computer program product comprising a non-transitory machine readable medium storing instructions that, when executed by at least one programmable processor, cause the at least one programmable processor to perform operations comprising:
receiving, by a topology manager of a distributed computing system, notification that a destination computing node in the distributed computing system is not responding to a communication request, the topology manager being implemented on a data partition of the distributed computing system, the distributed computing system comprising a plurality of computing nodes, the plurality of nodes comprising the destination computing node;
determining, by the topology manager, that the destination computing node is dead and/or has a loss of communication with one or more other computing nodes in the plurality of computing nodes by querying at least a subset of other computing nodes of the plurality of computing nodes regarding liveness of the destination computing node and receiving confirmation from a quorum of the queried computing nodes;
retiring, by the topology manager in response to the determining, the destination computing node, the retiring causing the destination computing node to become a retired computing node; and
causing, by the topology manager, a load balancing of replicas of data partitions in the distributed computing system to compensate for loss of the retired computing node, the load balancing comprising re-assigning one or more of the replicas of data partitions among one or more surviving computing nodes in the plurality of computing nodes.

8. A computer program product as in claim 7, wherein the determining further comprises the topology manager identifying that the destination computing node has not sent a status message to the topology manager in longer than a preset number of messaging periods.

9. A computer program product as in claim 7, wherein the notification is received from a source computing node of the plurality of computing nodes, the source computing node having sent the communication request to the destination computing node.

10. A computer program product as in claim 7, wherein the notification is received from a client machine accessing the distributed computing system, the client machine having sent the communication request to the destination computing node.

11. A computer program product as in claim 7, wherein the topology manager stores information about computing nodes in the plurality of computing nodes and a current state of these computing nodes.

12. A system comprising:
computer hardware configured to perform operations comprising:
receiving, by a topology manager of a distributed computing system, notification that a destination computing node in the distributed computing system is not responding to a communication request, the topology manager being implemented on a data partition of the distributed computing system, the distributed computing system comprising a plurality of computing nodes, the plurality of nodes comprising the destination computing node;
determining, by the topology manager, that the destination computing node is dead and/or has a loss of communication with one or more other computing nodes in the plurality of computing nodes by querying at least a subset of other computing nodes of the plurality of computing nodes regarding liveness of the destination computing node and receiving confirmation from a quorum of the queried computing nodes;
retiring, by the topology manager in response to the determining, the destination computing node, the retiring causing the destination computing node to become a retired computing node; and causing, by the topology manager, a load balancing of replicas of data partitions in the distributed computing system to compensate for loss of the retired computing node, the load balancing comprising re-assigning one or more of the replicas of data partitions among one or more surviving computing nodes in the plurality of computing nodes.

13. A system as in claim 12, wherein the determining further comprises the topology manager identifying that the destination computing node has not sent a status message to the topology manager in longer than a preset number of messaging periods.

14. A system as in claim 12, wherein the notification is received from a source computing node of the plurality of computing nodes, the source computing node having sent the communication request to the destination computing node.

15. A system as in claim 12, wherein the notification is received from a client machine accessing the distributed computing system, the client machine having sent the communication request to the destination computing node.

16. A system as in claim 12, wherein the topology manager stores information about computing nodes in the plurality of computing nodes and a current state of these computing nodes.

17. A system as in claim 12, wherein the computer hardware comprises a programmable processor and a machine readable medium storing instructions that, when executed by the programmable processor, cause the programmable processor to perform at least some of the operations.

* * * * *